L. H. WINEMAN.
COVER FOR COOKING UTENSILS.
APPLICATION FILED FEB. 24, 1917.

1,235,625.

Patented Aug. 7, 1917.

Witness
Philip E. Barnes

Inventor
Lillian H. Wineman.

By
G. B. Hamlin
Attorney

UNITED STATES PATENT OFFICE.

LILLIAN H. WINEMAN, OF DEVILS LAKE, NORTH DAKOTA.

COVER FOR COOKING UTENSILS.

1,235,625.    Specification of Letters Patent.    Patented Aug. 7, 1917.

Application filed February 24, 1917. Serial No. 150,779.

*To all whom it may concern:*

Be it known that I, LILLIAN H. WINEMAN, a citizen of the United States, residing at Devils Lake, county of Ramsey, and State of North Dakota, have invented certain new and useful Improvements in Covers for Cooking Utensils, of which the following is a specification.

This invention relates to covers for cooking utensils and has for its object the provision of a cover provided with an improved combined vent and drainage device and a novel duplex valve therefor which can be operated to completely close, or partially or fully expose, the vent and drainage portion, thereby adapting the cover to permit the escape of steam to any desired extent while the kettle, pan, or other utensil is in use and preventing boiling over of its contents. The invention also provides means for the convenient draining of the liquid from the utensil without danger of burning or scalding the hands of the user and, as the valve is settable to different positions, any desired rate of flow of the liquid from the vegetables or other foods being cooked can be readily had.

My invention is not limited to use on any particular cover nor to a cover for any particular cooking utensil and it may be made in any desired size; therefore, modifications may be resorted to without departing from the essential principle of the invention.

The embodiment of the invention hereinafter set forth, is to be considered as illustrative, rather than restrictive, of the scope thereof.

Figure 1:
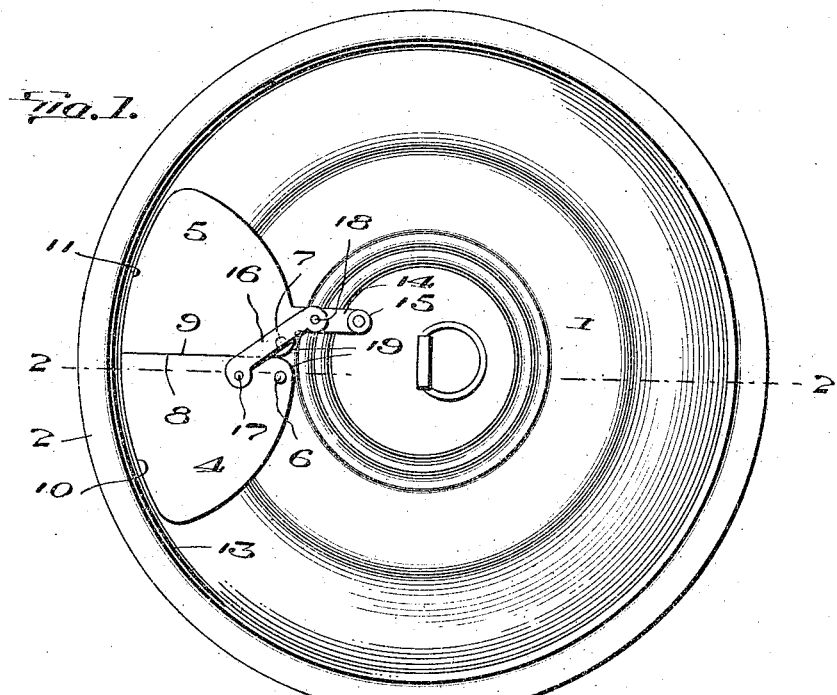
Figure 2:
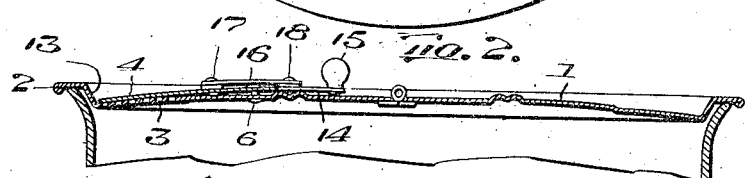
Figures 3, 4:
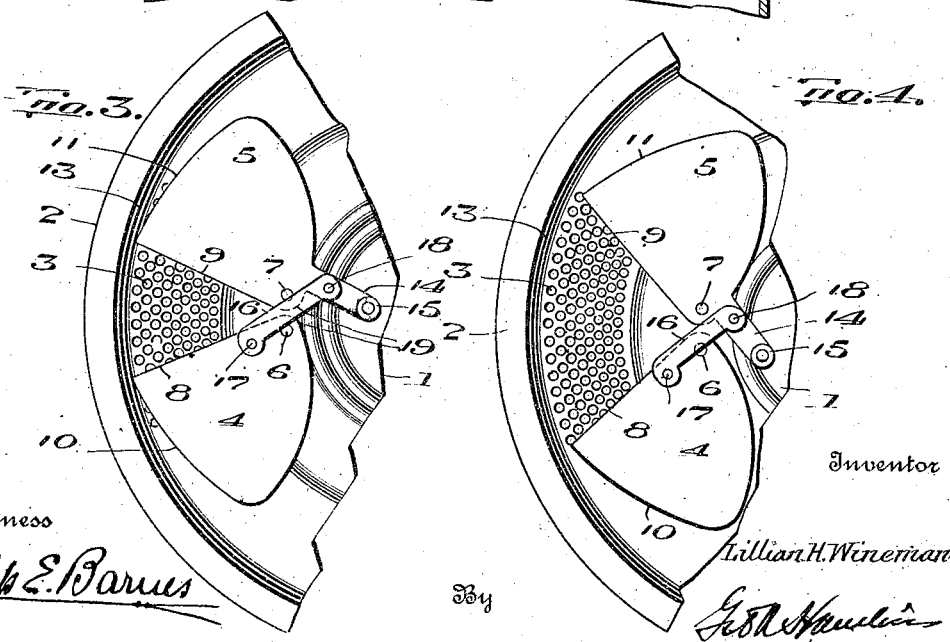

In the accompanying drawings:

Figure 1 is a plan view, the valve being closed;

Fig. 2 a section on line 2—2 Fig. 1;

Fig. 3 a detail plan view showing the valve partly open; and

Fig. 4 a similar view showing the valve fully opened.

The cover 1 may be of any desired form and size. A portion thereof adjacent the peripheral part 2 is provided with numerous perforations 3 for the escape of the steam from the vessel and the drainage of fluids therefrom.

My improved duplex valve comprises two shutters or plates 4, 5, respectively, pivoted at 6, 7 to the cover 1 by rivets or any other means and provided with straight edges 8, 9 which are adapted to abut when the shutters are closed as shown in Fig. 1. Preferably the edges 10, 11 are of a curvature substantially that of the wall 13 of the peripheral part 2 of the cover so that they substantially conform thereto when the shutters are closed. The points of pivoting 6, 7, are such that the edges 10, 11, clear the wall 13 when the valve is opened. One of the shutters is provided with a handle 14 having a suitable knob or finger piece 15. The finger piece 15, or any equivalent device, could be provided on one of the shutters 4, 5, and the handle 14 dispensed with. A link 16 pivoted to the shutters at 17 and 18, respectively, affords means whereby they are coupled together so that they will simultaneously open or close, when operated. The corners of the shutters may be rounded or cut away at 19 to prevent them from interfering when being opened.

Being in duplex form, the valve affords a quick and relatively wide opening with a slight movement of the finger piece 15 and a correspondingly rapid closing. By operating the valve the shutters may be set to expose any desired extent of the perforated vent 3 for the purpose of escape of the steam from a boiling liquid in a kettle, pan, or other utensil on which the cover is located, or, to enable any desired quantity of the liquid to be drained off without danger of the escaping steam or liquid burning the fingers or hands of the user.

Having thus described my invention, what I claim as new and desire to secure by Letters Patent is:—

A self-contained cover for cooking utensils having an open area in the region of its edge for the escape of steam and the draining of fluid, and provided with a duplex valve comprising a pair of separately pivoted shutters adapted to cover and uncover said open area, one of said shutters having an extension, and a link constituting a direct, positive connection between the extension aforesaid and the remaining shutter, whereby the shutters are adapted for simultaneous, and joint, opening and closing.

In testimony whereof, I hereunto affix my signature.

LILLIAN H. WINEMAN.

Copies of this patent may be obtained for five cents each, by addressing the "Commissioner of Patents, Washington, D. C."